(12) United States Patent
Azer (10) Patent No.: US 11,964,291 B2
(45) Date of Patent: Apr. 23, 2024

(54) POWER CONTROL FOR A FLUID SPRAYER WITH BATTERY POWER

(71) Applicant: Graco Minnesota Inc., Minneapolis, MN (US)

(72) Inventor: Rami A. Azer, Dayton, MN (US)

(73) Assignee: Graco Minnesota Inc., Minneapolis, MN (US)

(*) Notice: Subject to any disclaimer, the term of this patent is extended or adjusted under 35 U.S.C. 154(b) by 526 days.

(21) Appl. No.: 17/206,840

(22) Filed: Mar. 19, 2021

(65) Prior Publication Data

US 2022/0048059 A1    Feb. 17, 2022

Related U.S. Application Data

(60) Provisional application No. 63/136,606, filed on Jan. 12, 2021, provisional application No. 63/064,395, filed on Aug. 11, 2020.

(51) Int. Cl.
*B05B 12/08* (2006.01)
*B05B 9/04* (2006.01)
*G05B 15/02* (2006.01)

(52) U.S. Cl.
CPC ......... *B05B 12/085* (2013.01); *B05B 9/0413* (2013.01); *G05B 15/02* (2013.01)

(58) Field of Classification Search
CPC ..... B05B 12/085; B05B 9/0413; G05B 15/02; H02P 2101/15; H02P 23/0027

(Continued)

(56) References Cited

U.S. PATENT DOCUMENTS

| 5,752,661 A | 5/1998 | Lewis | |
|---|---|---|---|
| 2006/0045752 A1* | 3/2006 | Beckman | F04B 49/022 417/44.2 |

(Continued)

FOREIGN PATENT DOCUMENTS

| CN | 106460833 A | 2/2017 |
|---|---|---|
| CN | 106794481 A | 5/2017 |

(Continued)

OTHER PUBLICATIONS

First Chinese Office Action for CN Application No. 202110913752.7, dated Sep. 21, 2022, pp. 10.

(Continued)

*Primary Examiner* — Chun Cao
(74) *Attorney, Agent, or Firm* — Kinney & Lange, P. A.

(57) ABSTRACT

A battery powered fluid sprayer includes a reciprocating positive displacement pump, a power supply that includes a battery, an electric motor, a motor controller, a user-adjustment mechanism for setting a user-adjustable pressure threshold corresponding to system fluid pressure of the battery powered fluid sprayer, a pressure switch, and a power controller. The pressure switch generates a pressure signal indicative of whether the system fluid pressure is greater than the user-adjustable pressure threshold. The power controller is configured to control power of the battery powered fluid sprayer by providing operating power of the motor controller in response to the pressure signal indicating that the system fluid pressure is less than the user-adjustable pressure threshold, and not providing the operating power of the motor controller in response to the pressure signal indicating that the system fluid pressure is greater than the user-adjustable pressure threshold.

19 Claims, 7 Drawing Sheets

(58) Field of Classification Search
USPC .......................................................... 700/283
See application file for complete search history.

(56) References Cited

U.S. PATENT DOCUMENTS

| | | | |
|---|---|---|---|
| 2007/0204603 A1 | 9/2007 | Jacobs et al. | |
| 2011/0189032 A1* | 8/2011 | Hukriede | B05B 12/08 |
| | | | 417/364 |
| 2015/0050169 A1 | 2/2015 | Horie et al. | |
| 2015/0251223 A1 | 9/2015 | Horie et al. | |
| 2015/0378371 A1* | 12/2015 | Lange | G05B 15/02 |
| | | | 700/282 |
| 2016/0016207 A1* | 1/2016 | Horie | B08B 3/026 |
| | | | 134/198 |
| 2017/0066119 A1 | 3/2017 | Fu et al. | |
| 2017/0122304 A1* | 5/2017 | Funabashi | F04B 49/08 |
| 2018/0154386 A1 | 6/2018 | Zhang | |
| 2019/0224703 A1 | 7/2019 | Gustafson et al. | |
| 2019/0388918 A1* | 12/2019 | Gustafson | B05B 9/0861 |
| 2019/0388923 A1* | 12/2019 | Giacalone | B05B 12/00 |
| 2020/0050223 A1* | 2/2020 | Lange | B05B 12/004 |
| 2021/0046494 A1* | 2/2021 | Lam | H02J 7/0044 |
| 2021/0323033 A1 | 10/2021 | Sugiura | |

FOREIGN PATENT DOCUMENTS

| | | |
|---|---|---|
| CN | 108008743 A | 5/2018 |
| CN | 110753602 A | 2/2020 |
| EP | 1863106 A1 | 12/2007 |
| EP | 3159541 A1 | 4/2017 |
| IN | 206064968 U | 4/2017 |
| JP | H0634950 A | 2/1994 |
| JP | 2006015208 A | 1/2006 |
| JP | 2012030165 A | 2/2012 |
| JP | 2014100114 A | 6/2014 |
| WO | 2014119130 A1 | 8/2014 |
| WO | 2018132790 A1 | 7/2018 |
| WO | 2018140753 A1 | 8/2018 |
| WO | 2019161995 A1 | 8/2019 |
| WO | 2020044940 A1 | 3/2020 |
| WO | 2022073170 A1 | 4/2022 |

OTHER PUBLICATIONS

First Chinese Office Action for CN Application No. 202110916145.6, dated Sep. 30, 2022, pp. 19.
Extended European Search Report for EP Application No. 21190220.0, dated Jan. 19, 2022, 8 pages.
Extended European Search Report for EP Application No. 21190221.8, dated Jan. 17, 2022, 9 pages.

* cited by examiner

Fig. 4

POWER CONTROL FOR A FLUID SPRAYER WITH BATTERY POWER

CROSS-REFERENCE TO RELATED APPLICATION(S)

This application claims the benefit of U.S. Provisional Application No. 63/064,395 filed Aug. 11, 2020, and entitled "BATTERY POWERED FLUID SPRAYER," the disclosure of which is hereby incorporated by reference in its entirety. This application also claims the benefit of U.S. Provisional Application No. 63/136,606 filed Jan. 12, 2021, and entitled "BATTERY POWERED FLUID SPRAYER WITH STANDBY POWER CONTROL," the disclosure of which is hereby incorporated by reference in its entirety.

BACKGROUND

The present disclosure relates generally to fluid sprayers. More specifically, the disclosure relates to battery powered fluid sprayers with power conservation control.

Sprayers apply fluid to a surface through a nozzle. A pump draws the spray fluid from a reservoir, pressurizes the fluid, and drives the fluid downstream to a spray gun where the fluid is emitted as a spray through the nozzle. The pump can be powered in various manners, such as electrically, pneumatically, or hydraulically. Electrically powered pumps typically receive AC power from a power cord connected to a wall outed to receive constant and unlimited electric power. Sprayers can be configured to spray various fluids such as paint, varnish, finishing, or other type of coating. The fluid sprayed can be a sanitary fluid, such as for sterilization, cleaning, deodorizing, or another health-related application.

SUMMARY

In one example, a battery powered fluid sprayer includes a reciprocating positive displacement pump, a power supply that includes a battery, an electric motor, a motor controller, a user-adjustment mechanism for setting a user-adjustable pressure threshold corresponding to system fluid pressure of the battery powered fluid sprayer, a pressure switch, and a power controller. The electric motor is electrically connected to the battery and to the pump to drive operation of the pump for spraying. The motor controller is electrically connected to the electric motor to control operation of the electric motor. The pressure switch generates a pressure signal indicative of whether the system fluid pressure is greater than the user-adjustable pressure threshold. The power controller is electrically connected to the pressure switch and to the motor controller. The power controller is configured to control power of the battery powered fluid sprayer by providing operating power of the motor controller in response to the pressure signal indicating that the system fluid pressure is less than the user-adjustable pressure threshold, and not providing the operating power to the motor controller in response to the pressure signal indicating that the system fluid pressure is greater than the user-adjustable pressure threshold.

In another example, a method for conserving power of a battery powered fluid sprayer that includes a reciprocating positive displacement pump, a power supply that includes a battery, an electric motor electrically connected to the power supply and to the pump, a motor controller electrically connected to the electric motor, a pressure switch, and a power controller includes providing, by the pressure switch to the power controller, a pressure signal indicative of whether system fluid pressure of the battery powered fluid sprayer is greater than a user-adjustable pressure threshold corresponding to the system fluid pressure. The method further includes providing, by the power controller, operating power of the motor controller in response to the pressure signal indicating that the system fluid pressure is less than the user-adjustable pressure threshold, and refraining from providing, by the power controller, the operating power of the motor controller in response to the pressure signal indicating that the system fluid pressure is greater than the user-adjustable pressure threshold.

DETAILED DESCRIPTION

This disclosure relates generally to battery powered fluid sprayers. The battery powered sprayer can spray various fluids, such as paint, varnish, finishing, or other type of coating. The fluid sprayed can be a sanitary fluid, such as for sterilization, cleaning, deodorizing, or another health-related application. A battery provides electrical power for operation of components of the fluid sprayer, including an electric motor that powers a pump. The pump provides fluid under pressure (e.g., from a reservoir) to a spray gun. The fluid is emitted under pressure from a nozzle of the spray gun (e.g., a handheld spray gun) as a fluid spray.

According to techniques of this disclosure, the battery powered fluid sprayer includes a power controller that conserves power of a battery of the fluid sprayer. The power controller provides the operating power of components of the motor controller in response to system fluid pressure of the battery powered fluid sprayer being less than (or equal to) a threshold pressure that can be user-adjustable via an adjustment mechanism. The power controller refrains from providing the operating power to the components of the motor controller when the system fluid pressure is greater than (or equal to) the threshold pressure. As such, by providing the operating power to the motor controller only when the system fluid pressure indicates that an increase of pressure (and therefore operation of the electric motor) is called for to increase the system fluid pressure to meet the threshold pressure, the power controller can decrease the amount of power consumed by components of the battery powered fluid sprayer during operation. This, in turn, can extend the amount of operating time of the battery that provides electrical power (e.g., all electrical power) utilized for operation of the fluid sprayer.

Figure 1A:
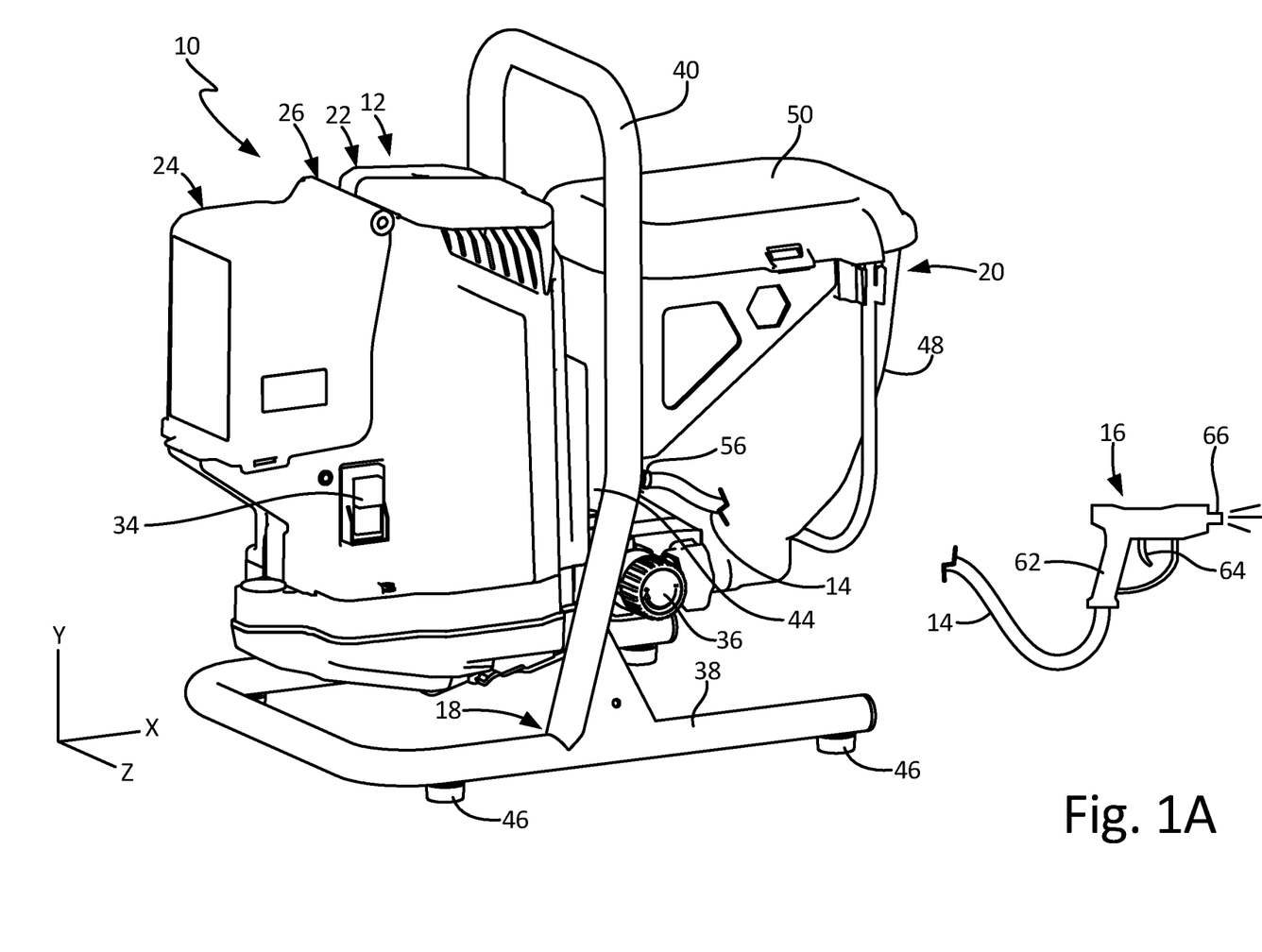
FIG. 1A is an isometric view of a spray system.
Figure 1B:
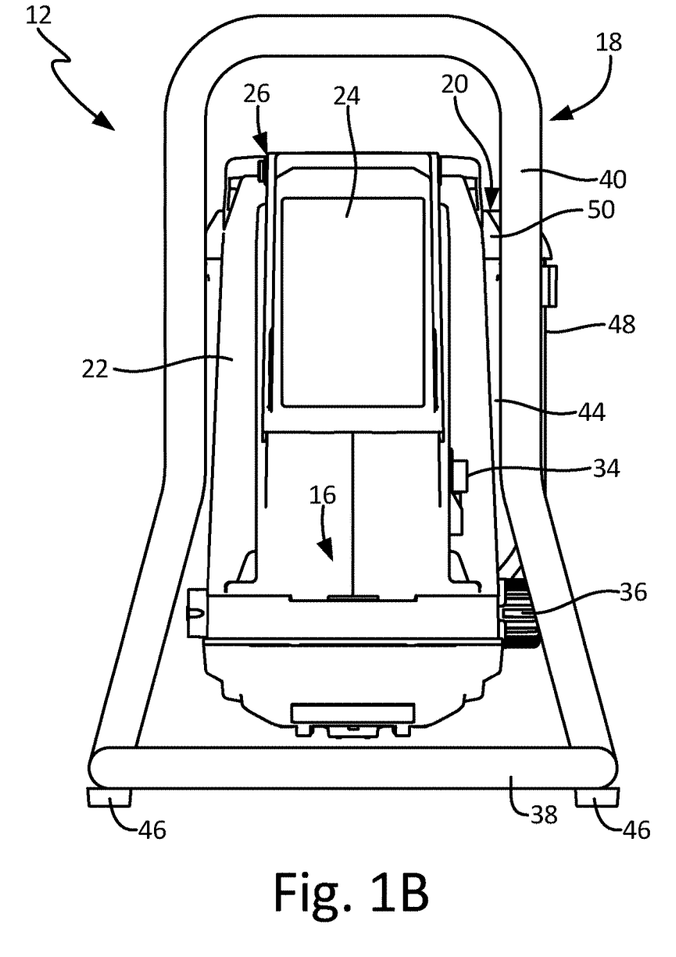
FIG. 1B is a front elevation view of a fluid sprayer.
Figure 1C:
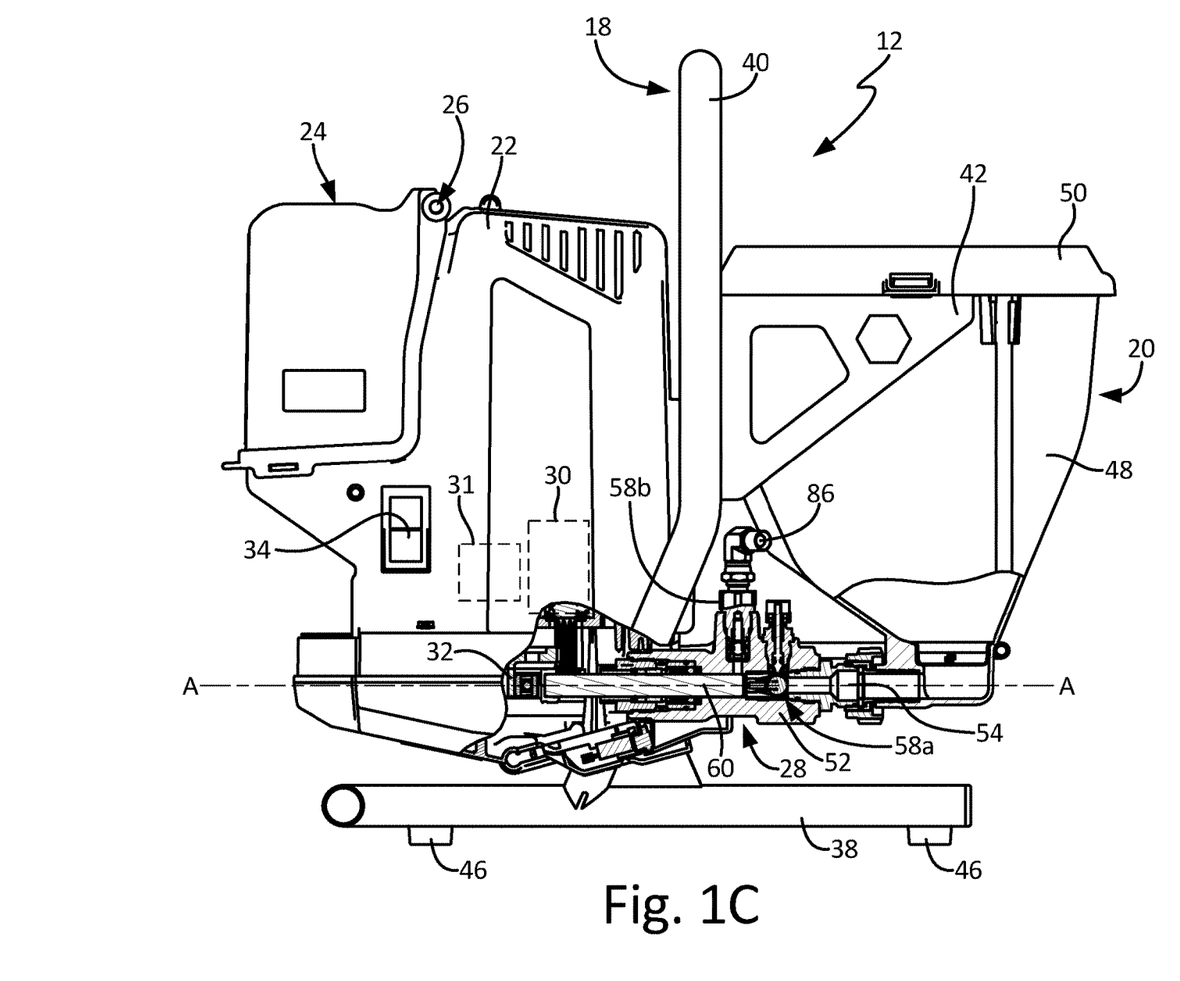
FIG. 1C is a side elevation, partial cross-sectional view of a fluid sprayer.

FIG. 1A is an isometric view of spray system 10. FIG. 1B is a front elevation view of fluid sprayer 12. FIG. 1C is a side elevation, partial cross-sectional view of fluid sprayer 12.

FIGS. 1A-1C will be discussed together. Spray system 10 includes fluid sprayer 12, hose 14, and spray gun 16. Fluid sprayer 12 includes frame 18, reservoir 20, housing 22, door 24, hinge 26, pump 28, motor 30, drive 32, switch 34, and pressure control 36. Frame 18 includes base portion 38, vertical portion 40, brackets 42, plate 44, and feet 46. Reservoir 20 includes reservoir body 48 and lid 50. Pump 28 includes pump body 52, pump inlet 54, pump outlet 56, check valves 58*a*, 58*b*, and piston 60. Spray gun 16 includes handle 62, trigger 64, and nozzle 66. As used herein, the terms "vertical" and "vertically" mean along direction Y, the terms "lateral" and "laterally" mean along direction Z, and the terms "longitudinal" and "longitudinally" mean along direction X.

Frame 18 supports other components of fluid sprayer 12 relative to a ground surface. Frame 18 includes base portion 38 that is oriented generally horizontally, parallel to the ground surface. Base portion 38 is disposed in the X-Z plane. In the example shown, base portion 38 is a U-shaped frame with a closed end of the U-shape disposed under the battery compartment covered by door 24 and the open end under reservoir 20. It is understood, however, that base portion 38 can be of any desired configuration. Base portion 38 can be formed from metallic tubing. In the example shown, feet 46 extend from base portion 38 to contact the ground surface and support the other parts of fluid sprayer 12 on the ground surface. Vertical portion 40 extends from a top side of base portion 38 and is connected to the two opposite legs of base portion 38. Vertical portion 40 can be grasped by a user to pick up and carry fluid sprayer 12 to reposition fluid sprayer 12 at a desired location for spraying. For example, a user can grasp the lateral top of vertical portion 40. As such, vertical portion 40 can be considered to form a handle of fluid sprayer 12. Vertical portion 40 can be formed by metallic tubing. Brackets 42 (only one of which is shown) extend from opposite vertical legs of vertical portion 40. Brackets 42 extend longitudinally away from housing 22 and are configured to interface with reservoir 20 to support reservoir 20 on frame 18. Plate 44 extends between and connects the opposite vertical legs of vertical portion 40. Housing 22 is connected to plate 44 such that plate 44 supports housing 22 on frame 18.

Reservoir 20, which can also be referred to as a hopper, is supported by frame 18. Reservoir body 48 is configured to store a supply of spray fluid for spraying. Reservoir body 48 interfaces with brackets 42 to mount reservoir 20 to frame 18. Lid 50 is disposed over a top opening of reservoir body 48. A seal can be formed between lid 50 and the lip of reservoir body 48 defining the top opening to seal the fluid within reservoir 20 and prevent splashing or other leaking of fluid from reservoir 20.

Housing 22 is supported by frame 18. In the example shown, housing 22 is connected to plate 44, such as by bolts, screws, or other fasteners. As such, plate 44 can be disposed between and separate the electronic components of fluid sprayer 12, which are disposed in and/or supported by housing 22, from the fluid stored in reservoir 20. Motor 30 and power controller 31 are disposed within housing 22. Motor 30 is an electric motor such as a brushed or brushless direct current (DC) motor or alternating current (AC) induction motor, among other options. Motor 30 is operably connected to piston 60 to drive reciprocation of piston 60 along pump axis A-A to cause pumping by pump 28. Power controller 31 is electrically connected to motor 30 and to components of a motor controller of motor 30 to regulate and conserve power of the motor controller, as is further described below. Drive 32 is disposed within housing 22 and is configured to convert a rotational output from motor 30 into a linear reciprocating input to piston 60. Drive 32 can be of any form suitable for converting the rotational output to a linear reciprocating input, such as a cam, wobble plate, scotch yoke, or eccentric crank, among other options. In some examples, housing 22 is formed as a clamshell housing that encloses various components of fluid sprayer 12, such as motor 30.

Switch 34 is disposed on housing 22 and is configured to control the power of fluid sprayer 12 on and off. Pressure control 36 is configured to control the output pressure for controlling operation of pump 28. In the example shown, pressure control 36 is a dial configured to increase or decrease tension on a spring to increase or decrease a threshold pressure at which a sensed output pressure from the pump 28 opens or closes a switch for communicating a command signal to control circuitry of fluid sprayer 12. The command signal can cause the control circuitry to provide power to motor 30 to operate motor 30.

Door 24 is supported by housing 22. Door 24 encloses a battery compartment that a battery of fluid sprayer 12 is disposed within, as discussed in more detail below. Door 24 is connected to housing 22 at hinge 26. Door 24 can pivot about hinge 26 between a closed state (shown in FIGS. 1A-1C) and an open state, as discussed in more detail below.

Pump 28 interfaces with reservoir 20 and is configured to pump fluid from reservoir 20 downstream through hose 14 to spray gun 16 for spraying by spray gun 16. Piston 60 is configured to reciprocate within pump body 52 along axis A-A to pump the fluid. The spray fluid is draw into pump 28 through pump inlet 54 and pumped downstream out of pump 28 through pump outlet 56. In the example shown, pump outlet 56 is disposed vertically above the reciprocation axis A-A of piston 60. Check valve 58*a* is disposed upstream of piston 60 and forms an inlet check valve of pump 28. Check valve 58*b* is disposed downstream of piston 60 and forms an outlet check valve of pump 28. Check valves 58*a*, 58*b* are one-way valves that allow flow from upstream to downstream and prevent flow from downstream to upstream. Check valves 58*a*, 58*b* can be ball valves, among other options.

During operation, the user can grasp handle 62 of spray gun 16 and pull trigger 64 to initiate spraying. Motor 30 is powered and generates the rotational output. Drive 32 receives the rotational output and converts that rotational output into linear reciprocating motion of piston 60. Piston 60 is drawn in a first axial direction (towards drive 32) through a suction stroke during which the volume of a chamber between the face of piston 60 and check valve 58*a* expands, causing check valve 58*a* to open and check valve 58*b* to close. Fluid is drawn into pump 28 through pump inlet 54 and into the chamber through check valve 58*a*. After completing the suction stroke, drive 32 turns over and drives piston in a second axial direction (towards check valve 58*a*) through a pressure stroke during which the volume of the chamber decrease. The reducing volume pressurizes the fluid in the chamber, causing check valve 58*a* to close and check valve 58*b* to open. The fluid in the chamber flows downstream through check valve 58*b* and out of pump outlet 56 to hose 14. The fluid flows through hose 14 to spray gun 16 where the fluid is emitted through nozzle 66 as an atomized fluid spray.

FIG. 1D is an isometric view of fluid sprayer 12 showing door 24 in an open state. Frame 18, reservoir 20, housing 22, door 24, hinge 26, switch 34, pressure control 36, and battery 68 are shown. Frame 18 includes base portion 38, vertical portion 40, brackets 42, plate 44, and feet 46. Reservoir 20 includes reservoir body 48 and lid 50.

Figure 1D:
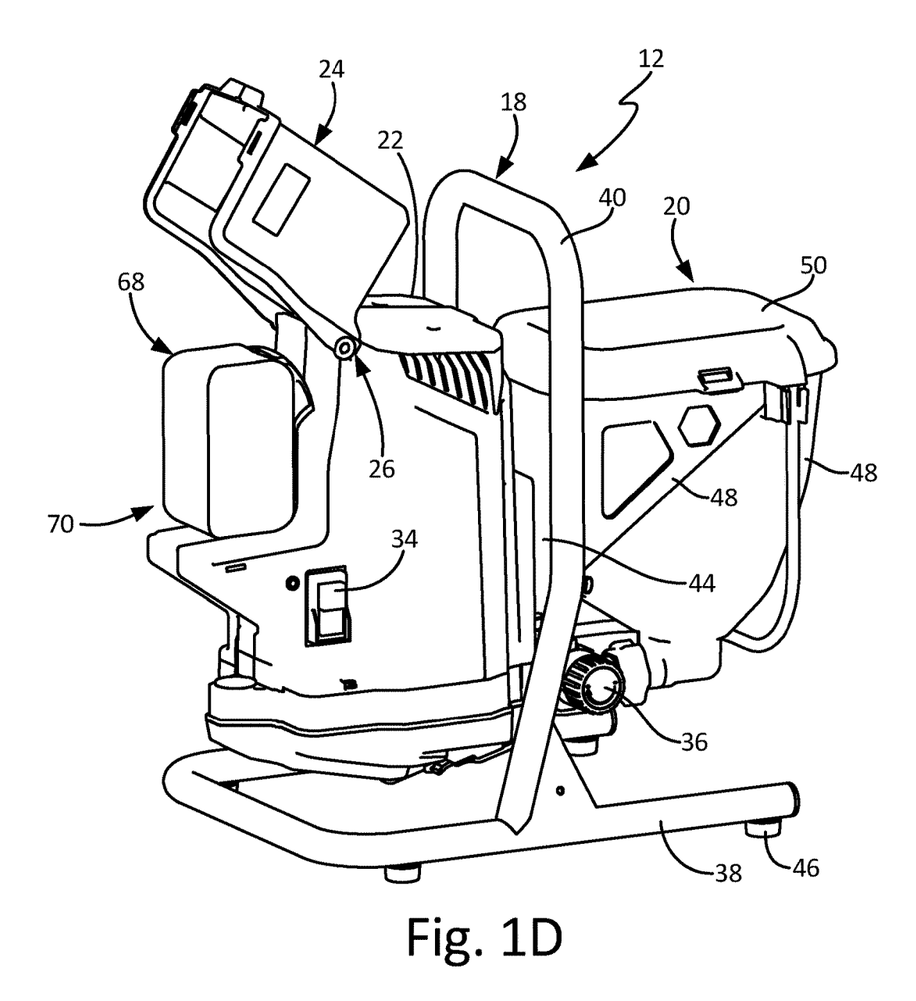
FIG. 1D is an isometric view of a fluid sprayer with a door in an open state.

Door 24 is connected to housing 22 at hinge 26. For example, door 24 can include connectors at opposite lateral sides of door 24 through which one or more pins can extend to form pivot points that connect door 24 to housing 22. Door 24 is configured to pivot between the closed state (FIGS. 1A-1C) and the open state (FIG. 1D). Door 24 encloses battery 68 within the battery compartment when in the closed state. Battery 68 is exposed and can be accessed by a user with door 24 in the open state. Door 24 is connected to housing 22 such that door 24 is balanced open when in the open state. Door 24 is configured to self-close when moved in a direction from the open state toward the closed state. Door 24, enclosing the battery compartment, shields battery 68 from the spray fluid during spray operations. For example, overspray, which is spray fluid that does not adhere to a surface, can be present in the air around fluid sprayer 12 during spraying. Door 24 and the walls defining the battery compartment shield battery 68 from the fluid and route the fluid away from battery 68.

Accordingly, fluid sprayer 12, drawing operational power for electronic components from battery 68, can be operated at various locations where wall power is not readily accessible. Moreover, as is further described below, power controller 31 conserves power of fluid sprayer 12 by selectively providing operating power of a motor controller of motor 30 based on fluid pressure within fluid sprayer 12. As such, power controller 31 can help to extend an amount of operating time of fluid sprayer 12 on a single charge of battery 68.

Figure 2:
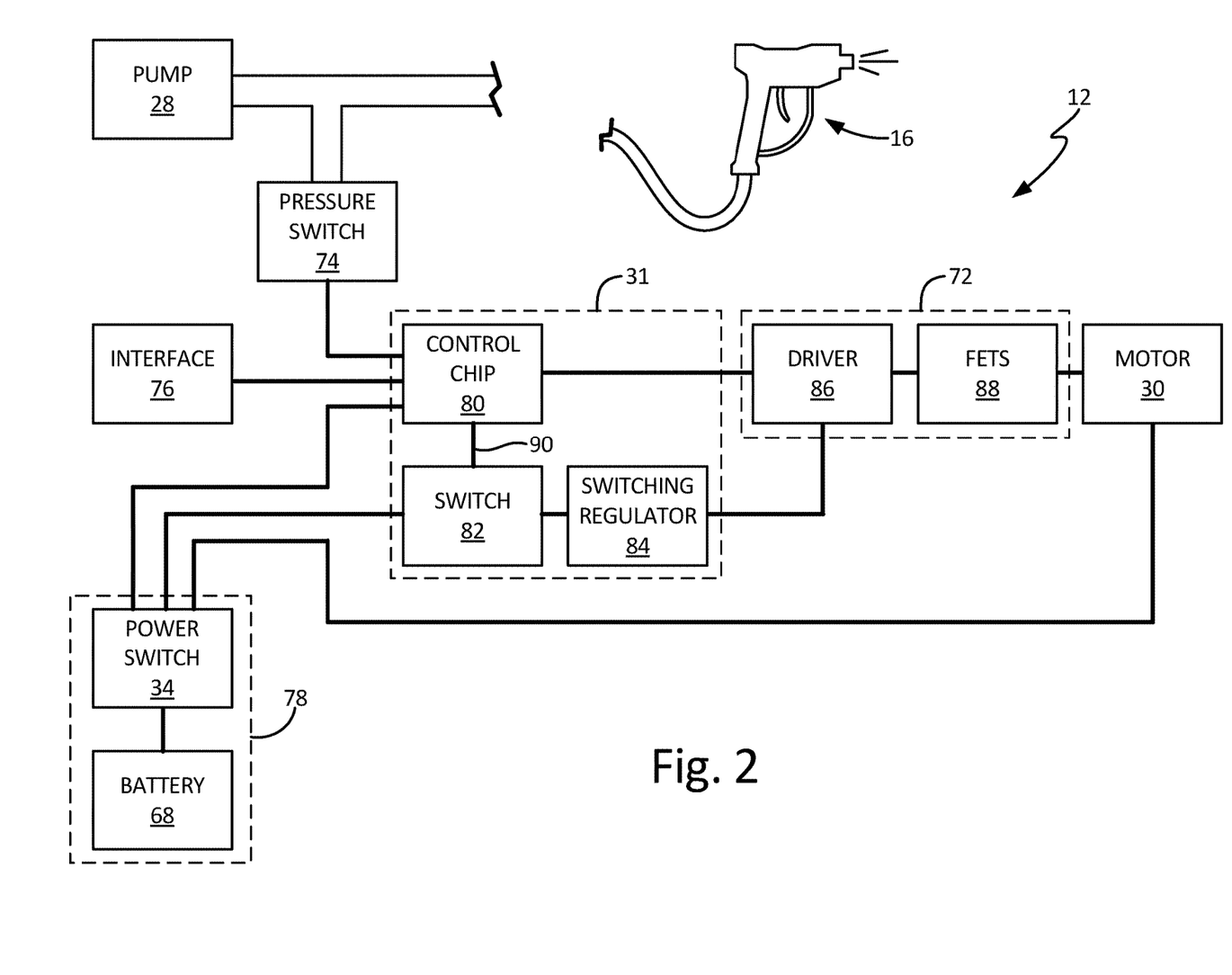
FIG. 2 is a block diagram illustrating components of a fluid sprayer including a power controller that controls operating power of a motor controller of the fluid sprayer.

FIG. 2 is a block diagram illustrating example components of fluid sprayer 12, including power controller 31 that controls operating power to motor controller 72. As illustrated in FIG. 2, fluid sprayer 12 further includes spray gun 16, pump 28, motor 30, pressure switch 74, interface 76, and power supply 78. Power supply 78 includes power switch 34 and battery 68. Power controller 31 includes control chip 80, enable switch 82, and switching regulator 84. Motor controller 72 includes driver 86 and field-effect transistors (FETs) 88.

As described above, spray gun 16 includes a handle, a trigger, and a nozzle for user actuation and spraying of fluid that is pressurized via pump 28 and delivered to spray gun 16 via, e.g., hydraulic tubing or other fluid connection. As such, spray gun 16 can be described, in some examples, as a hand-held spray gun that enables user actuation and hand-held movement for spraying fluid. Pump 28, as illustrated and described in FIGS. 1A-1D, can be a reciprocating positive displacement piston pump that is operatively connected to motor 30 for pumping fluid under pressure from a reservoir downstream to spray gun 16 for spraying. While the examples of FIGS. 1A-1D illustrate and describe pump 28 as a linear reciprocating piston pump, it should be understood that pump 28 can be any type of reciprocating positive displacement pump, such as the illustrated reciprocating piston pump, a reciprocating diaphragm pump, or other type of reciprocating positive displacement pump.

Motor 30 is an electric motor, such as a brushed or brushless direct current (DC) motor or alternating current (AC) induction motor, among other options. Motor 30 is operatively connected to pump 28 to drive pump 28 and cause the pumping of fluid by pump 28. Power switch 34, as described above, is disposed on a housing of fluid sprayer 12 and is configured to control the electrical power of fluid sprayer 12 between an "off" state (i.e., at state in which electrical power is not being drawn from battery 68) and an "on" state (i.e., a state in which electrical power is drawn from battery 68).

Battery 68 provides electrical power to components of fluid sprayer 12. Battery 68 can be, for example, a Sealed Lead Acid (SLA) battery, a Lithium-Ion battery, or other type of battery. While illustrated in the examples of FIGS. 1A-1D and FIG. 2 as a single battery, it should be understood that battery 68, in some examples, can take the form of multiple individual batteries that together form a battery pack or other battery source supplying electric power to the various electronic components of fluid sprayer 12. In some examples, such as the example of FIG. 2, battery 68 provides all electric power utilized by fluid sprayer 12 for operation. As such, fluid sprayer 12 can be operated at various locations where, e.g., wall power is not readily accessible, thereby enabling fluid sprayer 12 to be more easily moved during a spray job without having to plug and unplug fluid sprayer 12 from an electric power source.

Pressure switch 74 is a switch configured to provide a pressure signal (e.g., an electrical command signal or other electrical signal) to power controller 31 that controls operating power to motor controller 72. In some examples, pressure switch 74 is operatively connected to or includes a user-adjustment mechanism for setting a user-adjustable pressure threshold. For instance, in certain examples, pressure switch 74 can be operatively connected (i.e., mechanically connected, electrically connected, and/or communicatively connected) to pressure control 36 illustrated in FIGS. 1A, 1B, and 1D, which can include a dial or other user-adjustment mechanism for increasing or decreasing tension on a spring that corresponds to the user-adjustable pressure threshold. The tension on the spring can control a threshold pressure at which a system fluid pressure opens or closes pressure switch 74 for communicating the pressure signal to power controller 31, as is further described below. As such, pressure switch 74 can, in some examples, be a mechanical pressure control that, based on adjusted spring tension, opens or closes pressure switch 74 to provide an electrical signal to power controller 31. In other examples, pressure switch 74 can include a pressure transducer or other pressure sensor and associated electrical components to sense system fluid pressure of fluid sprayer 12 and to open or close pressure switch 74 based on the sensed fluid pressure to provide the electrical signal to power controller 31 indicative of whether the system fluid pressure satisfies a threshold pressure (e.g., the user-adjusted pressure threshold).

Interface 76 can include user input and/or output elements for enabling user interaction with components of fluid sprayer 12. For example, interface 76 can include buttons, switches, dials, light emitting diodes (LEDs) or other lights, a graphical display including, e.g., user input and/or output elements, or other graphical and/or mechanical input and/or output elements for enabling user interaction with components of fluid sprayer 12 and/or for providing status or other output information to a user.

Power supply 78, including power switch 34 and battery 68, converts electric current drawn from battery 68 to operating voltage(s), current(s), and frequency (or frequencies) utilized by electrical components of fluid sprayer 12. For instance, as illustrated in the example of FIG. 2, power supply 78 can supply operating power to motor 30 for operation of motor 30 to cause pump 28 to pump fluid under pressure for spraying by spray gun 16. Operating power provided by power supply 78 to motor 30 can be at a different voltage than operating power provided to other components of fluid sprayer 12, such as to power controller 31. For instance, power supply 78 can supply operating power for motor 30 at a voltage of, e.g., sixty (60) volts or other voltage, and can supply operating power for other components such as power controller 31 at a different voltage, such as five volts or other voltage.

As illustrated in FIG. 2, power controller 31 includes control chip 80, enable switch 82, and switching regulator 84. Control chip 80 can be, e.g., a microprocessor, a digital signal processor (DSP), an application specific integrated circuit (ASIC), a field-programmable gate array (FPGA), or other equivalent discrete or integrated logic circuitry configured to implement functionality and/or process instructions for execution within power controller 31.

In some examples, control chip 80 can include onboard computer-readable memory. In other examples, power controller 31 can include computer-readable memory that is separate from control chip 80 and electrically and/or communicatively coupled with control chip 80.

Computer-readable memory of power controller 31 can be configured to store information during operation of fluid sprayer 12. In some examples, the computer-readable memory can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, the computer-readable memory can include temporary memory elements, meaning that a primary purpose of such computer-readable memory elements is not long-term storage. In certain examples, temporary memory elements can be described as volatile memory, meaning that the temporary memory elements do not maintain stored contents when electrical power to fluid sprayer 12 is turned off. Examples of volatile memories can include random access memories (RAM), dynamic random access memories (DRAM), static random access memories (SRAM), and other forms of volatile memories.

In some examples, the computer-readable memory of power controller 31 is used to store program instructions for execution by control chip 80. For instance, computer-readable memory of power controller 31 can be used by software, firmware, or applications executed by control chip 80 during operation of fluid sprayer 12. Computer-readable memory of power controller 31 can, in some examples, also include non-volatile storage elements configured to maintain stored contents when electrical power to fluid sprayer 12 is turned off. Examples of such non-volatile storage elements can include flash memories, forms of electrically programmable memories (EPROM), electrically erasable and programmable (EEPROM) memories, or other forms of non-volatile storage elements.

As is further described below, enable switch 82 includes switching elements to selectively route power received from power supply 78 to switching regulator 84 in response to power enable control command 90 provided to enable switch 82 by control chip 80. Switching regulator 84 includes power regulating components to convert power received at a first voltage of operating power to operating power at a second voltage that is provided to motor controller 72.

Motor controller 72, which includes driver 86 and FETs 88, controls and coordinates performance of motor 30. Driver 86 of motor controller 72 includes components for providing electrical control commands to motor 30 via FETs 88 for starting and stopping motor 30. In some examples, such as when motor 30 is a variable speed electric motor, driver 86 can provide control signals via FETs 88 to coordinate or otherwise control an operational speed of motor 30.

As illustrated in FIG. 2, pump 28 is fluidly connected, via one or more hoses or other fluid connection, to spray gun 16 to provide fluid under pressure for spraying by spray gun 16. Pressure switch 74, as illustrated in FIG. 2, is fluidly connected to sense system fluid pressure within fluid sprayer 12. Pressure switch 74 is electrically connected to control chip 80 to transmit an electrical signal to control chip 80, the electrical signal being indicative of whether sensed fluid pressure is greater than or less than threshold pressure criteria, as is further described below.

Interface 76 is operatively connected (e.g., electrically and/or communicatively connected) to control chip 80 of power controller 31. Power supply 78 is electrically connected to battery 68 via power switch 34 to draw power from battery 68 and to deliver electric power to components of fluid sprayer 12 during operation. Power supply 78, as illustrated in FIG. 2, is electrically connected to control chip 80 and to enable switch 82 of power controller 31.

Control chip 80 is further electrically connected to enable switch 82 to provide an electrical power enable signal to enable switch 82 in response to receiving the pressure signal from pressure switch 74 indicative of whether the system fluid pressure is greater than or less than the threshold pressure criteria. Switching regulator 84 is electrically connected between enable switch 82 and driver 86 of motor controller 72 to provide operating power of driver 86. Driver 86 is electrically connected via FETs 88 to motor 30 to control operation of motor 30.

In operation, a user-adjustable threshold pressure corresponding to system fluid pressure of fluid sprayer 12 is set via pressure control 36 (FIGS. 1A, 1B, and 1D). The user-adjustable threshold pressure can be a system fluid pressure corresponding to a user-settable operating pressure for fluid sprayer 12, such as a pressure of 2200 pounds per square inch (psi), 3200 psi, or other operating fluid pressure. As described above, pressure control 36 includes a user-adjustment mechanism for setting the threshold pressure, such as a dial, a knob, or other user-adjustment mechanism. For instance, the user-adjustment mechanism can include a dial, the rotation of which is configured to increase or decrease tension on a spring of pressure switch 74 to increase or decrease the threshold pressure. In such examples, pressure switch 74 can be considered a mechanical switch that opens or closes to transmit an electrical signal (also referred to herein as a pressure signal) indicative of whether system fluid pressure is greater than or less than the user-adjustable threshold pressure. For instance, pressure switch 74 can open (or close) to transmit the electrical pressure signal to control chip 80 in response to the system fluid pressure being greater than threshold pressure set by the tension on the spring of pressure switch 74. Pressure switch 74 can close (or open) to prevent transmission of the electrical pressure signal to control chip 80 in response to the system fluid pressure being less than the threshold pressure set by the tension of the spring. In other examples, pressure switch 74 can open (or close) to transmit the electrical pressure signal to control chip 80 in response to the system fluid pressure being less than the threshold pressure, and can close (or open) to prevent transmission of the electrical pressure signal to control chip 80 in response to the system fluid pressure being greater than the threshold pressure.

Accordingly, pressure switch 74 can transmit the electrical pressure signal to control chip 80 in response to the system fluid pressure satisfying the user-adjustable pressure threshold, and can refrain from transmitting the electrical pressure signal (or otherwise cause the electrical pressure signal to not be transmitted) to control chip 80 in response to the system fluid pressure failing to satisfy the user-adjustable pressure threshold. The electrical pressure signal transmitted from pressure switch 74 to control chip 80 can therefore be indicative of whether system fluid pressure is less than the user-adjustable pressure threshold such that operation of motor 30 is called for to increase system fluid pressure within fluid sprayer 12 to satisfy the pressure threshold, or whether system fluid pressure meets (or exceeds) the user-adjustable pressure threshold such that operation of motor 30 is not called for to increase the system fluid pressure within fluid sprayer 12.

Control chip 80, in response to receiving the electrical pressure signal from pressure switch 74, controls the transmission of power enable control command 90 to enable/disable switch 82. Control chip 80 does not transmit power enable control command 90 in response to determining that the electrical pressure signal from pressure switch 74 is not received (or otherwise indicates that system fluid pressure is greater than (or equal to) the pressure threshold). Power enable control command 90 can be, e.g., an active high electrical control signal transmitted at a voltage of, e.g., 5 volts or other voltage, as is further described below. In other examples, power enable control command 90 can be an active low signal, such that control chip 80 transmits the power enable control command 90 by dropping the voltage of the control signal to a designated low voltage limit (e.g., ground).

Enable switch 82, in response to receiving power enable control command 90, supplies operating power at a first voltage (e.g., five volts, or other voltage) received from power supply 78 to switching regulator 84. As is further described below, enable switch 82 does not supply the operating power at the first voltage received from power supply 78 to switching regulator 84 when enable switch 82 does not receive power enable control command 90. Switching regulator 84 converts the operating power received at the first voltage (e.g., five volts) to an operating power at a second voltage (e.g., fifteen volts, or other voltage) that is supplied to driver 86 of motor controller 72 as operating power for motor controller 72.

As was described above, operating power supplied by switching regulator 84 to driver 86 can be considered operating power for driver 86 of motor controller 72, but is not operating power for motor 30. In contrast, as illustrated in FIG. 2, operating power for motor 30 is supplied by power supply 78 to motor 30 independent of whether the pressure signal provided by pressure switch 74 to control chip 80 indicates that the system fluid pressure is greater than or less than the user-adjustable pressure threshold. As such, power controller 31 controls power of fluid sprayer 12 by selectively supplying operating power of motor controller 72 while maintaining operating power to motor 30. Driver 86, under command from control chip 80 (or other control circuitry), is operable to transmit control commands to motor 30 via FETs 88 when operating power is supplied by power controller 31. In contrast, when operating power is not supplied to motor controller 72 by power controller 31, driver 86 does not draw electrical power from battery 68. Operating power for control chip 80 (and other components of sprayer 12) is supplied by power supply 78 (i.e., responsive to operation of power switch 34) even when operating power for motor controller 72 is not supplied by power controller 31. As such, power controller 31 can effectively remove power (and the associated electrical power draw from battery 68) to certain components of fluid sprayer 12 (e.g., driver 86) while maintaining power to other components of fluid sprayer 12 during operation.

Accordingly, power controller 31, implementing techniques of this disclosure, conserves electrical power of fluid sprayer 12 by selectively providing power to motor controller 72 in response to a received pressure signal indicating whether system fluid pressure satisfies threshold pressure criteria. As such, power controller 31 can help to increase the amount of operating time of battery 68 on a single charge by providing operating power of motor controller 72 when the fluid pressure signal indicates that an increase of system fluid pressure and corresponding operation of motor 30 is called for to increase system fluid pressure, and refraining from providing the operating power to motor controller 72 when the fluid pressure signal indicates that an increase of fluid pressure and corresponding operation of motor 30 is not called for to increase the system fluid pressure.

Figure 3:
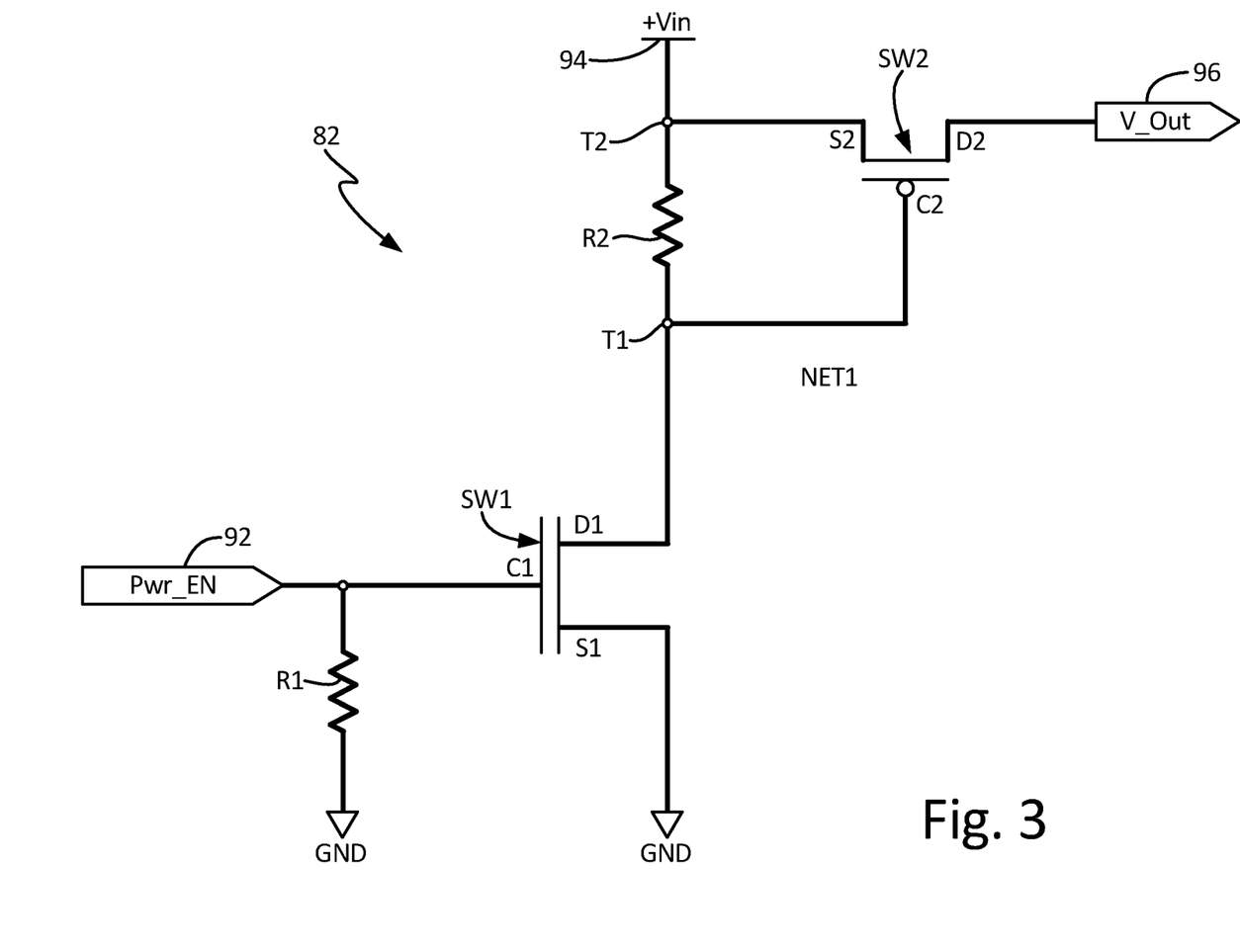
FIG. 3 is an electrical schematic diagram illustrating components of an operating power enable switch of a fluid sprayer.

FIG. 3 is an electrical schematic diagram illustrating example components of enable switch 82 of FIG. 2. As illustrated in FIG. 3, enable switch 82 includes power enable input port 92, power supply port 94, power output port 96, first switching element SW1, and second switching element SW2. First switching element SW1 includes control terminal C1, drain terminal D1, and source terminal S1. Second switching element SW2 includes control terminal C2, source terminal S2, and drain terminal D2. While in the example of FIG. 3, first switching element SW1 is illustrated and described as an N-Channel Metal Oxide Silicon Field Effect Transistor (MOSFET) and second switching element SW2 is illustrated and described as a P-Channel MOSFET, it should be understood that either or both of first switching element SW1 and second switching element SW2 can take the form of any of various switching elements that accomplish the switching functionality attributed herein to first switching element SW1 and second switching element SW2.

Power enable input port 92 is connected to receive power enable control command 90 (FIG. 2). Power supply port 94 is connected to receive operating power at a first voltage (e.g., five volts) from power supply 78, as illustrated in FIG. 2. Power output port 96 is connected to supply the operating power at the first voltage to switching regulator 84 (FIG. 2).

As illustrated in FIG. 3, resistor R1 is connected between power enable input port 92 and a ground reference. Power enable input port 92 is also connected to control terminal C1 of first switching element SW1. First switching element SW1 is configured to open and close between NET1 and a ground reference. NET1 connects drain terminal D1 of first switching element SW1 to control terminal C2 of second switching element SW2 and to first terminal T1 of resistor R2. Second terminal T2 of resistor R2 is connected to power supply port 94 and to source terminal S2 of second switching element SW2. Drain terminal D2 of second switching element SW2 is connected to power output port 96.

In operation, when a high signal is presented to control terminal C1 of first switching element SW1 via power enable input port 92, first switching element SW1 turns on. In response to first switching element SW1 turning on, the voltage at first terminal T1 of resistor R2 goes low. When the voltage at first terminal T1 of resistor R2 goes low, second switching element SW2 turns on. When second switching element SW2 turns on, operating power at the first voltage (e.g., five volts) is provided to power output port 96, which is in turn provided to switching regulator 84 (FIG. 2).

In response to a low signal being presented to control terminal C1 of first switching element SW1 via power enable input port 92, first switching element SW1 turns off. In response to first switching element SW1 turning off, the voltage at first terminal T1 of resistor R2 goes high. When the voltage at first terminal T1 of resistor R2 goes high, second switching element SW2 turns off. When second switching element SW2 turns off, operating power at the first voltage (e.g., five volts) is not provided to power output port 96 that is connected to switching regulator 84 (FIG. 2). Accordingly, enable switch 82 selectively provides operating power at the first voltage supplied by power supply 78 to switching regulator 84 (FIG. 2) based on power enable control command 90 provided by control chip 80 (FIG. 2).

Figure 4:
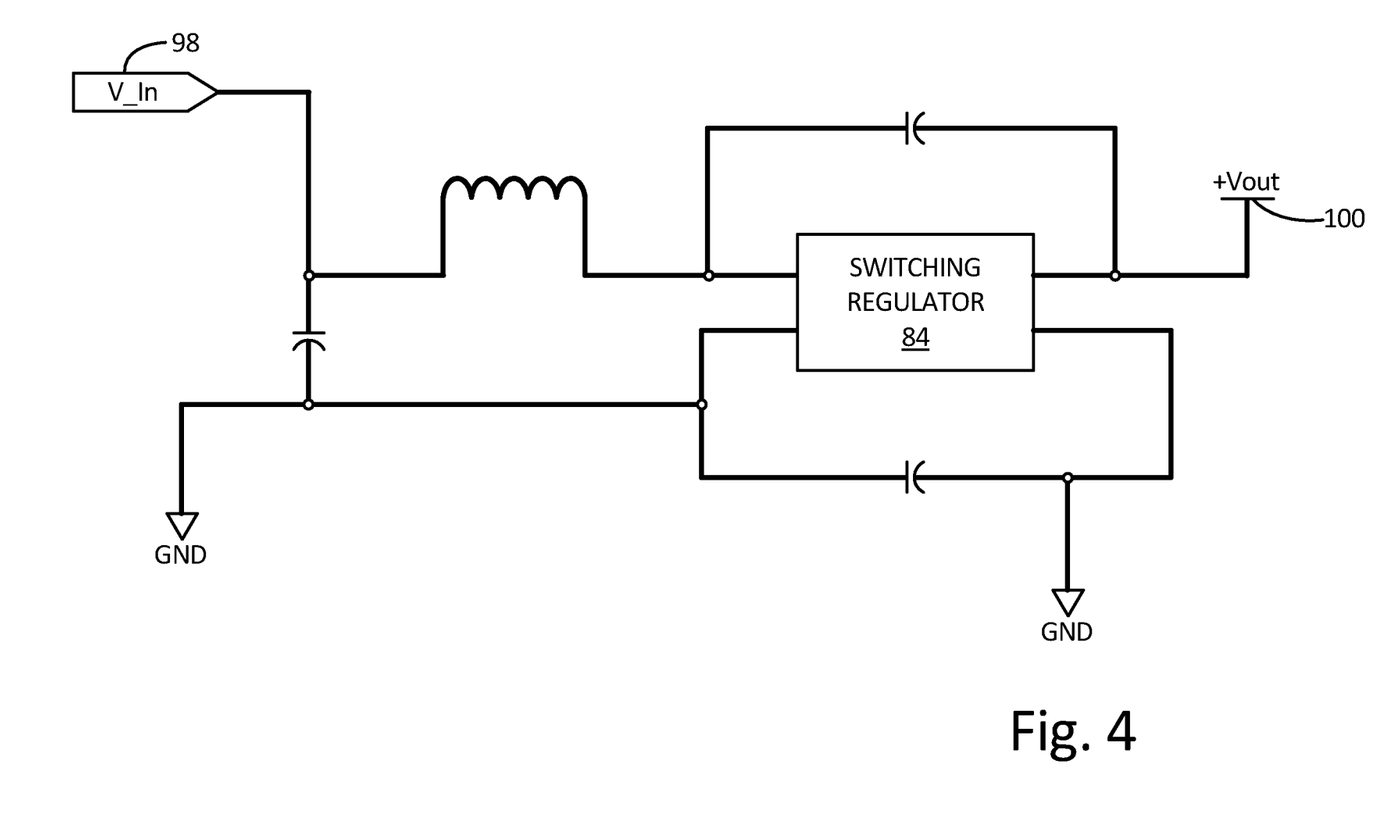
FIG. 4 is an electrical schematic diagram illustrating components of a switching regulator of a fluid sprayer.

FIG. 4 is an electrical schematic diagram illustrating example components of switching regulator 84 of FIG. 2. As is well known in the art, switching regulator 84 is configured to convert power from a first voltage level to a second voltage level. In the example of FIG. 4, input power is received on input port 98, which is connected to receive operating power at a first voltage (e.g., five volts) via power output port 96 (FIG. 3). Operating power at the first voltage is provided to switching regulator 84. Switching regulator 84 converts the first voltage to a second voltage of output power (e.g., fifteen volts), which is provided on output port 100 as the source of operating power of driver 86 (FIG. 2). As such, switching regulator 84 converts power from a first voltage of operating power (e.g., five volts) to a second, higher voltage of operating power (e.g., fifteen volts) that is provided as the source of operating power for motor controller 72 (FIG. 2).

Accordingly, a power controller, implementing techniques described herein, conserves electrical power of a fluid sprayer by selectively providing operating power to a motor controller of a motor in response to a received pressure signal indicating whether system fluid pressure of the fluid sprayer is greater than or less than threshold pressure criteria. The power controller can therefore reduce the power consumption on the battery of the fluid sprayer by refraining from providing operating power to components of the motor controller when the threshold pressure criteria is satisfied, such as when the system fluid pressure meets or exceeds a user-adjustable pressure threshold. The techniques of this disclosure can therefore help to increase an amount of operating time of the fluid sprayer on a single battery charge, thereby enhancing usability of the fluid sprayer.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A battery powered fluid sprayer comprising:
   a reciprocating positive displacement pump;
   a power supply that includes a battery;
   an electric motor electrically connected to the power supply and connected to the pump to drive operation of the pump for spraying;
   a motor controller electrically connected to the electric motor to control operation of the electric motor, the motor controller including at least one field-effect transistor, the motor controller configured to control operation of the electric motor via the at least one field-effect transistor;
   a user-adjustment mechanism for setting a user-adjustable pressure threshold corresponding to system fluid pressure of the battery powered fluid sprayer;
   a pressure switch that generates a pressure signal indicative of whether the system fluid pressure is greater than the user-adjustable pressure threshold; and
   a power controller, electrically connected to the pressure switch and to the motor controller, the power controller configured to control power of the battery powered fluid sprayer by:
      providing operating power of the motor controller in response to the pressure signal indicating that the system fluid pressure is less than the user-adjustable pressure threshold such that the field-effect transistor is powered; and
      not providing the operating power of the motor controller in response to the pressure signal indicating that the system fluid pressure is greater than the user-adjustable pressure threshold such that the field-effect transistor is depowered;
   wherein the operating power of the motor controller is not operating power of the electric motor;
   wherein the motor controller controls starting and stopping of the electric motor; and
   wherein the motor controller controls an operational speed of the electric motor.

2. The battery powered fluid sprayer of claim 1, wherein the power supply provides the operating power of the electric motor independent of whether the pressure signal provided by the pressure switch indicates that the system fluid pressure is greater than or less than the user-adjustable pressure threshold.

3. The battery powered fluid sprayer of claim 2, wherein the power supply further comprises a power switch electrically connected to the battery; and
wherein the power supply provides the operating power to the electric motor in response to operation of the power switch.

4. The battery powered fluid sprayer of claim 1, wherein the battery provides all electric power required for operation of the battery powered fluid sprayer.

5. The battery powered fluid sprayer of claim 1, wherein the power controller includes a power regulator that converts power from a first voltage of power received to a second voltage of power provided as the operating power of the motor controller.

6. The battery powered fluid sprayer of claim 5, wherein the power controller further includes an enable switch that provides power of the first voltage to the power regulator.

7. The battery powered fluid sprayer of claim 6, wherein the power controller further includes a control chip that:
   receives the pressure signal from the pressure switch;
   provides the power of the first voltage to the enable switch in response to the pressure signal indicating that the system fluid pressure is less than the user-adjustable pressure threshold; and
   does not provide the power of the first voltage to the enable switch in response to the pressure signal indicating that the system fluid pressure is greater than the user-adjustable pressure threshold.

8. The battery powered fluid sprayer of claim 7, wherein the enable switch includes a first switching element and a second switching element;
wherein the first switching element is electrically connected to receive the power of the first voltage from the control chip and to selectively provide the power of the first voltage to the second switching element in response to receiving the power of the first voltage from the control chip; and wherein the second switching element is electrically connected to provide the power of the first voltage to the power regulator in response to receiving the power of the first voltage from the first switching element.

9. The battery powered fluid sprayer of claim 7,
wherein the control chip draws power from the power supply independent of whether the power of the first voltage is provided to the enable switch by the control chip.

10. The battery powered fluid sprayer of claim 5,
wherein the first voltage of power is less than the second voltage of power.

11. The battery powered fluid sprayer of claim 1,
wherein the user-adjustment mechanism for setting the user-adjustable pressure threshold comprises a user-adjustable dial that adjusts tension on a spring, the tension on the spring corresponding to the user-adjustable pressure threshold.

12. The battery powered fluid sprayer of claim 1,
wherein the pump is a piston pump having a piston configured to reciprocate along a reciprocation axis to provide pressurized fluid for spraying.

13. A method for conserving power of a battery powered fluid sprayer that includes a reciprocating positive displacement pump, a power supply that includes a battery, an electric motor electrically connected to the power supply and to the pump, a motor controller electrically connected to the electric motor, a pressure switch, and a power controller electrically connected to the pressure switch and to the motor controller, the method comprising:

providing, by the pressure switch to the power controller, a pressure signal indicative of whether system fluid pressure of the battery powered fluid sprayer is greater than a user-adjustable pressure threshold corresponding to the system fluid pressure;

providing, by the power controller, operating power of the motor controller, the motor controller including at least one field-effect transistor and the motor controller configured to control operation of the electric motor via the at least one field-effect transistor, in response to the pressure signal indicating that the system fluid pressure is less than the user-adjustable pressure threshold such that the field-effect transistor is powered;

refraining from providing, by the power controller, the operating power of the motor controller in response to the pressure signal indicating that the system fluid pressure is greater than the user-adjustable pressure threshold such that the field-effect transistor is depowered; and providing, by the power controller, operating power of the electric motor both when the field-effect transistor is powered and when the field-effect transistor is depowered;

wherein the operating power of the motor controller is not operating power of the electric motor.

14. The method of claim 13, further comprising:
providing operating power of the electric motor independent of whether the pressure signal provided by the pressure switch indicates that the system fluid pressure is greater than or less than the user-adjustable pressure threshold.

15. The method of claim 13, further comprising:
providing, by the battery, all electric power required for operation of the battery powered fluid sprayer.

16. The method of claim 13, wherein the power controller includes a power regulator, the method further comprising:
receiving, by the power regulator, power at a first voltage of operating power;
converting, by the power regulator, the first voltage of operating power to a second voltage of operating power; and
providing, by the power regulator, the second voltage of operating power as the operating power of the motor controller.

17. The method of claim 16, wherein the power controller further includes an enable switch, the method further comprising:
providing, by the enable switch, the operating power of the first voltage to the power regulator.

18. The method of claim 17, wherein the power controller further includes a control chip, the method further comprising:
receiving, by the control chip, the pressure signal from the pressure switch;
providing, by the control chip, the operating power of the first voltage to the enable switch in response to the pressure signal indicating that the system fluid pressure is less than the user-adjustable pressure threshold; and
refraining from providing, by the control chip, the operating power of the first voltage to the enable switch in response to the pressure signal indicating that the system fluid pressure is greater than the user-adjustable pressure threshold.

19. A battery powered fluid sprayer comprising:
a reciprocating positive displacement pump;
a power supply that includes a battery;
an electric motor electrically connected to the power supply and to the pump to drive operation of the pump for spraying;
a motor controller electrically connected to the electric motor to control operation of the electric motor;
a user-adjustment mechanism for setting a user-adjustable pressure threshold corresponding to system fluid pressure of the battery powered fluid sprayer;
a pressure switch that generates a pressure signal indicative of whether the system fluid pressure is greater than the user-adjustable pressure threshold; and
a power controller, electrically connected to the pressure switch and to the motor controller, the power controller configured to control power of the battery powered fluid sprayer by:
providing operating power of the motor controller in response to the pressure signal indicating that the system fluid pressure is less than the user-adjustable pressure threshold;
not providing the operating power of the motor controller in response to the pressure signal indicating that the system fluid pressure is greater than the user-adjustable pressure threshold; and
providing operating power of the motor both when providing the operating power of the motor controller and when not providing the operating power of the motor controller.

* * * * *